United States Patent
Fu et al.

(10) Patent No.: US 11,282,155 B2
(45) Date of Patent: Mar. 22, 2022

(54) MISMATCHED DRIVER DETECTION

(71) Applicant: Beijing DiDi Infinity Technology and Development Co., Ltd., Beijing (CN)

(72) Inventors: Conghui Fu, Santa Clara, CA (US); Dong Li, Santa Clara, CA (US); Jing Chen, Palo Alto, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 334 days.

(21) Appl. No.: 16/438,315

(22) Filed: Jun. 11, 2019

(65) Prior Publication Data

US 2020/0394741 A1    Dec. 17, 2020

(51) Int. Cl.
*G06Q 10/10*    (2012.01)
*G06Q 10/08*    (2012.01)
*G06Q 30/02*    (2012.01)
*G06Q 50/26*    (2012.01)
*G06N 20/00*    (2019.01)

(52) U.S. Cl.
CPC .......... *G06Q 50/265* (2013.01); *G06N 20/00* (2019.01)

(58) Field of Classification Search
CPC ....... G06Q 50/265; G06N 20/00; G06N 5/046
USPC .......................................... 705/1.1–912, 325
See application file for complete search history.

(56) References Cited

U.S. PATENT DOCUMENTS

| | | | | |
|---|---|---|---|---|
| 4,360,875 A * | 11/1982 | Behnke | ............... | G01C 21/00 379/93.02 |
| 8,781,984 B2 * | 7/2014 | Schreiner | ............... | G06Q 30/02 706/45 |
| 8,875,267 B1 * | 10/2014 | Kolman | ............... | G06F 21/31 726/7 |
| 2008/0277183 A1 * | 11/2008 | Huang | ............... | B60R 25/33 180/271 |
| 2013/0191898 A1 * | 7/2013 | Kraft | ............... | G06F 21/31 726/6 |

(Continued)

FOREIGN PATENT DOCUMENTS

| CN | 105938654 A | 9/2016 |
|---|---|---|
| CN | 106056839 A | 10/2016 |
| CN | 109543597 A | 3/2019 |

OTHER PUBLICATIONS

PCT International Search Report and the Written Opinion dated Sep. 15, 2020, issued in related International Application No. PCT/CN2020/095255 (9 pages).

*Primary Examiner* — Jonathan P Ouellette
(74) *Attorney, Agent, or Firm* — Sheppard, Mullin, Richter & Hampton LLP (57) ABSTRACT

Mismatched drivers may be identified based on passenger evaluations. A set of evaluations may be obtained. Each evaluation in the set of evaluations may be based on whether a current driver matches a registered driver. A convergence point number may be obtained. The convergence point number may be a number of evaluations required for accurate identification. An identification rate may be computed based on the set of evaluations and the convergence point number. The current driver may be verified based on a comparison of the identification rate to a threshold match rate. If the identification rate is greater than a threshold match rate, it may be determined that the identity of the current driver is valid. If the identification rate is not greater than a threshold match rate, the current driver may be identified as a mismatched driver.

16 Claims, 6 Drawing Sheets

(56) References Cited

U.S. PATENT DOCUMENTS

| | | | |
|---|---|---|---|
| 2015/0156208 A1* | 6/2015 | Kirkham | G06F 21/31 726/4 |
| 2015/0204684 A1* | 7/2015 | Rostamian | G06Q 10/101 701/537 |
| 2016/0171637 A1* | 6/2016 | Rai | G06F 3/04847 705/13 |
| 2017/0106877 A1 | 4/2017 | Phelan | |
| 2017/0158114 A1* | 6/2017 | Fournier | B60R 25/25 |
| 2017/0187707 A1* | 6/2017 | Miu | H04W 12/06 |
| 2020/0081611 A1* | 3/2020 | Beaurepaire | A61B 5/0205 |
| 2020/0210678 A1* | 7/2020 | Yi | H04W 12/63 |
| 2020/0349666 A1* | 11/2020 | Hodge | G06F 21/36 |

* cited by examiner

MISMATCHED DRIVER DETECTION

TECHNICAL FIELD

The disclosure relates generally to identifying mismatched drivers in a ride sharing platform.

BACKGROUND

Under traditional approaches, ridesharing platforms may be able to connect passengers and drivers on relatively short notice. However, traditional ridesharing platforms suffer from a variety of safety and security risks for both passengers and drivers.

SUMMARY

A claimed solution rooted in computer technology overcomes problems specifically arising in the realm of computer technology. In various implementations, a computing system may comprise one or more processors and one or more non-transitory computer-readable memories coupled to the one or more processors and configured with instructions executable by the one or more processors. Executing the instructions may cause the system to perform operations. The operations may include obtaining a set of evaluations. Each evaluation in the set of evaluations may be based on whether a current driver matches a registered driver. The operations may further include obtaining a convergence point number. The convergence point number may include a number of evaluations required for accurate identification. The operations may further include computing an identification rate based on the set of evaluations and the convergence point number. The operations may further include verifying the current driver based on a comparison of the identification rate to a threshold match rate. If the identification rate is greater than a threshold match rate, it may be determined that the identity of the current driver is valid. If the identification rate is not greater than a threshold match rate, the current driver may be identified as a mismatched driver.

Another aspect of the present disclosure is directed to a method configured to: obtain a set of evaluations, wherein each evaluation in the set of evaluations is based on whether a current driver matches a registered driver; obtain a convergence point number, wherein the convergence point number is a number of evaluations required for accurate identification; compute an identification rate based on the set of evaluations and the convergence point number; verify the current driver based on a comparison of the identification rate to a threshold match rate; determine the identity of the current driver is valid if the identification rate is greater than the threshold match rate; and identify the current driver as a mismatched driver if the identification rate is below the threshold match rate.

Yet another aspect of the present disclosure is directed to a non-transitory computer-readable storage medium configured with instructions executable by one or more processors to cause the one or more processors to perform operations configured to obtain a set of evaluations, wherein each evaluation in the set of evaluations is based on whether a current driver matches a registered driver; obtain a convergence point number, wherein the convergence point number is a number of evaluations required for accurate identification; compute an identification rate based on the set of evaluations and the convergence point number; verify the current driver based on a comparison of the identification rate to a threshold match rate; determine the identity of the current driver is valid if the identification rate is greater than the threshold match rate; and identify the current driver as a mismatched driver if the identification rate is below the threshold match rate.

In some embodiments, the number of evaluations in the set of evaluations may equal the convergence point number; and the identification rate may equal the number of evaluations which identify the current driver as the registered driver divided by the number of evaluations in the set of evaluations.

In some embodiments, the identification rate may be recomputed in response to receiving a set of additional evaluations.

In some embodiments, the identification rate may be recomputed after a set duration of time has elapsed.

In some embodiments, the threshold match rate may be based on a statistical analysis of a set of identification rates for a set of drivers.

In some embodiments, a number of allowed mismatches may be computed based on the threshold match rate and convergence point number; it may be determined that a number of mismatches in the set of evaluations exceeds the number of allowed mismatches; and the current driver may be identified as a mismatched driver.

In some embodiments, a user account of the driver in a ride sharing application may be blocked if the current driver is identified as a mismatched driver.

In some embodiments, the set of evaluations may be obtained from a set of passengers in a ride sharing platform.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION OF THE EMBODIMENTS

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

The approaches disclosed herein may improve the safety and security of a ride sharing service. Safety is one of the top priorities in the ridesharing business. Incidents caused by drivers are a major source of insecurity to passengers during trips. Driver caused incidents have a very negative impact on the reputation of the ride sharing platform. For many driver caused incidents, the current driver is not the driver registered on the platform. This may be the result of an account being transferred, borrowed, sold, or stolen from a registered driver. Safety and security may be improved by quickly identifying mismatched drivers.

Mismatched drivers may be identified by asking passengers whether their current driver matches the driver listed in the ride sharing application. However, passenger identifications may not always be correct. The appearance of the driver may change, or the passenger may lie. For example, the driver could change their hair style, it could be hard to see the driver's face due to the lighting condition, or the passenger may intentional answer incorrectly due to a conflict with the driver (e.g., an argument over price).

Drivers may be identified by computing an identification rate for a driver using a set of evaluations from a group of passengers. The identification rate may be inaccurate if the group of passengers is too small. Each evaluation has a lot of weight initially, so the identification rate may fluctuate a lot with each new evaluation. However, waiting for additional evaluations costs time. Delaying the identification of a mismatched driver increases the chances for an incident to occur. The identification rate may converge to a state of low fluctuation after enough evaluations are received. Drivers may be identified as close to the convergence point as possible in order to make an accurate identification and avoid delay.

Figure 1:
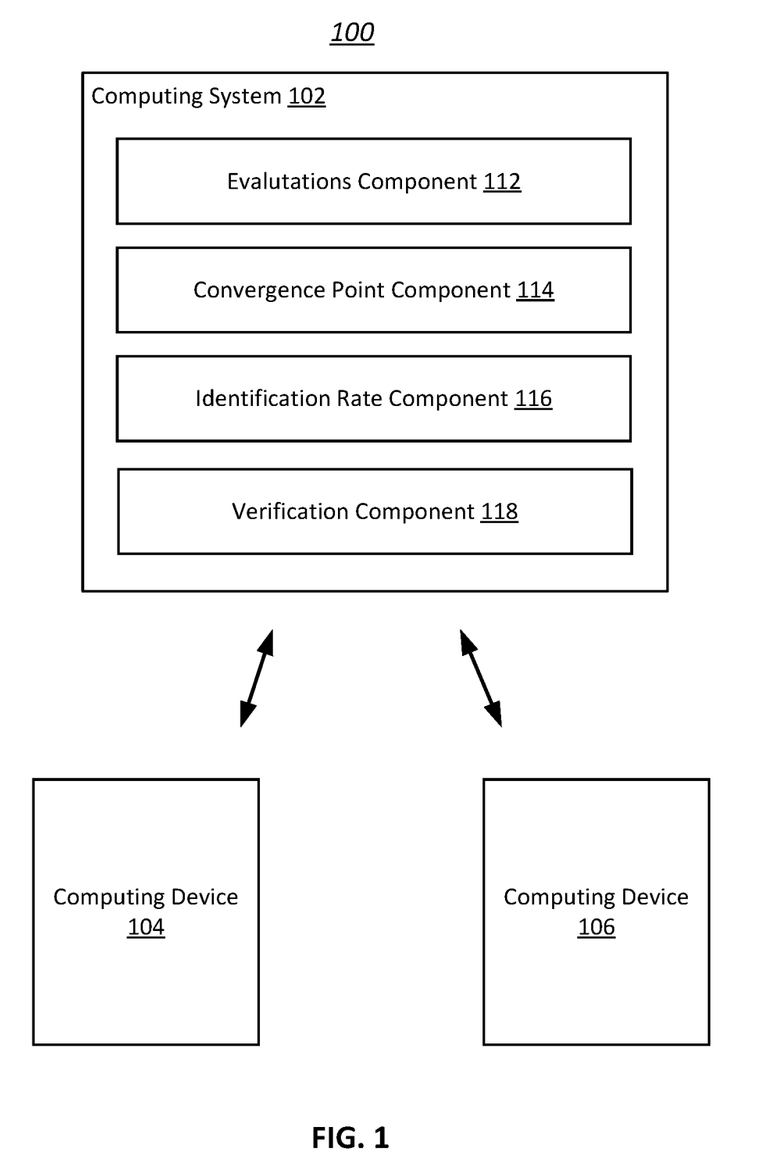
FIG. 1 illustrates an example environment to which techniques for identifying mismatched drivers may be applied, in accordance with various embodiments.

FIG. 1 illustrates an example environment 100 to which techniques for identifying mismatched drivers may be applied, in accordance with various embodiments. The example environment 100 may include a computing system 102, a computing device 104, and a computing device 106. It is to be understood that although two computing devices are shown in FIG. 1, any number of computing devices may be included in the environment 100. Computing system 102 may be implemented in one or more networks (e.g., enterprise networks), one or more endpoints, one or more servers, or one or more clouds. A server may include hardware or software which manages access to a centralized resource or service in a network. A cloud may include a cluster of servers and other devices which are distributed across a network. The computing devices 104 and 106 may be implemented on or as various devices such as mobile phone, tablet, server, desktop computer, laptop computer, vehicle (e.g., car, truck, boat, train, autonomous vehicle, electric scooter, electric bike), etc. The computing system 102 may communicate with the computing devices 104 and 106, and other computing devices. Computing devices 104 and 106 communicate with each other through computing system 102, and may communicate with each other directly. Communication between devices may occur over the internet, through a local network (e.g., LAN), or through direct communication (e.g., Bluetooth, radio frequency, infrared).

While the computing system 102 is shown in FIG. 1 as a single entity, this is merely for ease of reference and is not meant to be limiting. One or more components or one or more functionalities of the computing system 102 described herein may be implemented in a single computing device or multiple computing devices. The computing system 102 may include a rider context information component 112, a location information component 114, an itinerary generation component 116, and a ranking component 118. The computing system 110 may include other components. The computing system 102 may include one or more processors (e.g., a digital processor, an analog processor, a digital circuit designed to process information, a central processing unit, a graphics processing unit, a microcontroller or microprocessor, an analog circuit designed to process information, a state machine, and/or other mechanisms for electronically processing information) and memory (e.g., permanent memory, temporary memory). The processor(s) may be configured to perform various operations by interpreting machine-readable instructions stored in the memory. The computing system 102 may include other computing resources. In some implementations, computing system 102 may comprise a single self-contained hardware device configured to be communicatively coupled or physically attached to a component of a computer system. In some implementations, computing system 102 may include an application specific integrated circuit (ASIC) or a field-programmable gate array (FPGA) configured to perform transaction verification operations associated with one or more decentralized applications. The computing system 102 above may be installed with appropriate software (e.g., platform program, etc.) and/or hardware (e.g., wires, wireless connections, etc.) to access other devices of the environment 100.

The evaluations component 112 may be configured to obtain a set of evaluations. Each evaluation in the set of evaluations may be based on whether a current driver matches a registered driver. Obtaining information may include one or more of accessing, acquiring, analyzing, determining, examining, identifying, loading, locating, opening, receiving, retrieving, reviewing, storing, or otherwise obtaining the information. In some embodiments, the set of evaluations may be obtained from a set of passengers in a ride sharing platform. Each evaluation may be received from a different passenger. For example, a question may be displayed in a ride sharing application asking if a current driver of the ride sharing vehicle matches the driver listed in the ride sharing application.

In some embodiments, the ride sharing application may be installed on the passenger's phone and associated with a user account of the passenger. In some embodiments, the question may be displayed as a pop up in the ride sharing application. In some embodiments, the evaluation may record the driver as a mismatched driver if the passenger fails to respond to the evaluation. In some embodiments, the question may be displayed before the passenger enters the ride sharing vehicle. In some embodiments, the question may be displayed during a ride, while the passenger is in the ride sharing vehicle. In some embodiments, the question may be displayed after a ride and after the passenger has exited the ride sharing vehicle.

In some embodiments, the driver may be listed in the ride sharing application with information about the driver and vehicle. In some embodiments, the information about the driver may include the drivers name, a picture of the driver, the driver's eye color, the driver's hair color, and the driver's height. In some embodiments, the information about the vehicle may include, a make, model, license plate number, and color. In some embodiments, each passenger using the rider sharing application may be asked if their current driver matches a registered driver.

The convergence point component 114 may be configured to obtain a convergence point number. In some embodiments, the convergence point number may include a number of evaluations required for accurate identification. In some embodiments, the convergence point number may identify the sample size of the set of evaluations used for driver verification. In some embodiments, identification rate may fluctuate a lot when the identification rates are based on a small set of evaluations. A highly fluctuating identification rate may inaccurately identify mismatched drivers. Identification rates may converge after enough evaluations are received. In some embodiments, the convergence point number may be the number of evaluations required for identification rates to converge. In some embodiments, the lowest possible convergence point number may be selected so that the driver validation does not have to wait for additional evaluations. In some embodiments, the convergence point number may be preset to a default value (e.g. 20 evaluations). In some embodiments, the convergence point number may be set by a user.

In some embodiments, the convergence point number may be based on statistical analysis of historical data. For example, fluctuation rates may be calculated based on identification rates for drivers in the rider sharing platform. The fluctuation rates may equal the square of a first identification rate minus a second identification divided by either two times the first identification rate of the number of evaluations (e.g., $(IR1-IR2)^2/(2IR1)$, $(IR1-IR2)^2/n$). The first identification rate may be calculated for a driver based on a set of evaluations. The second identification rate may be calculated when one new evaluation is added to the set of evaluations. In some embodiments, the convergence point number may be the point at which a stable identification rate is achieved, which approaches the true identification rate. In some embodiments, the convergence point number may be calculated by averaging fluctuation rates across all the drivers in the rider sharing platform. In some embodiments, the convergence point number may be calculated based on a region (e.g., country, state, city). When a large database of drivers is used, the convergence point number may remain accurate and consistent as new drivers join the platform.

The identification rate component 116 may be configured to compute an identification rate based on the set of evaluations and the convergence point number. In some embodiments, the identification rate may be an identification rate for the current driver in a ride sharing trip. In some embodiments, the identification rate may equal the number of evaluations which identify the current driver as the registered driver divided by the total number of evaluations in the set of evaluations. In some embodiments, the number of evaluations in the set of evaluations may equal the convergence point number. In some embodiments, the identification rate may not be computed until the current driver receives the convergence point number of evaluations. For example, the current driver may be a new driver on the ride sharing platform. An identification rate for the new driver may not be computed until the new driver receives twenty evaluations.

In some embodiments, the identification rate may be recomputed in response to receiving a set of additional evaluations. For example, the ride sharing application may continue to ask passengers for evaluations after the initial identification rate is computed. In some embodiments, the most recent convergence point number of evaluations may be stored in a buffer. The identification rate may be recomputed using the evaluations in the buffer. In some embodiments, the identification rate may be recomputed after a set duration of time has elapsed. In some embodiments, the identification rate may be recomputed using a random set of the convergence point number of evaluations. For example, the convergence point number may equal twenty, and the hundredth evaluation may have just been received. The identification rate may be recomputed using evaluations seventy to eighty nine. In some embodiments, identification rates may be calculated for multiple drivers.

The identification rate component 118 may be configured to verify the current driver based on a comparison of the identification rate to a threshold match rate. The threshold match rate may be an identification rate required for the driver to be considered as the correct driver. In some embodiments, the identity of the current driver may be determined to be valid if the identification rate is greater than the threshold match rate. In some embodiments, the current driver may be identified as a mismatched driver if the identification rate is below the threshold match rate.

In some embodiments, the threshold match rate may be based on a statistical analysis of a set of identification rates for a set of drivers. The threshold match rate may be a statistically significant identification rate. For example, the match rate may be two or three standard deviations below the median identification rate for the set of drivers. In some embodiments, the threshold match rate may be set by a user. In some embodiments, the threshold match rate may be preset. The threshold match rate may be set based on the tradeoff between misclassifying good driver as mismatches and safety. For example, most drivers may have more than an eighty percent identification rate. Setting the threshold match rate at eighty percent may not misclassify too many good drivers. If the threshold match rate is too low, mismatched drivers may not be caught. In some embodiments, the threshold match rate may automatically adjust in response to a high number of misclassifications of drivers. For example, if a high number of drivers identified as correct drivers commit crimes and it is discovered that the drivers did not match the registered drivers, the threshold match rate may be increased. In some embodiments, the threshold match rate may be calculated based on a region (e.g., country, state, city).

In some embodiments, the current driver may be identified as a mismatched driver before a convergence point number of evaluations are received. A number of allowed mismatches may be computed based on the threshold match rate and convergence point number. The current driver may be identified as a mismatched driver when a number of mismatches in the set of evaluations exceeds the number of allowed mismatches. For example, if the convergence point number is twenty and the threshold match rate is eighty percent, the identification rate will be below the threshold match rate if there are more than four evaluations of a mismatched driver. As soon as the fifth mismatch evaluation is received, the current driver may be identified as a mismatched driver.

In some embodiments, a user account of the driver may be blocked in a ride sharing application if the current driver is identified as a mismatched driver. Blocking a user account may include suspending or canceling the user account. In some embodiments, a second match rate threshold may be used to identify suspicious driver. For example, the second match rate threshold may be higher than the first match rate threshold. Passengers may be warned (e.g., via a notification and/or alert provided to their device) that the driver is suspicious if the driver's identification rate is below the second match rate threshold. This may give the passenger the opportunity to find another driver.

Figure 2A:
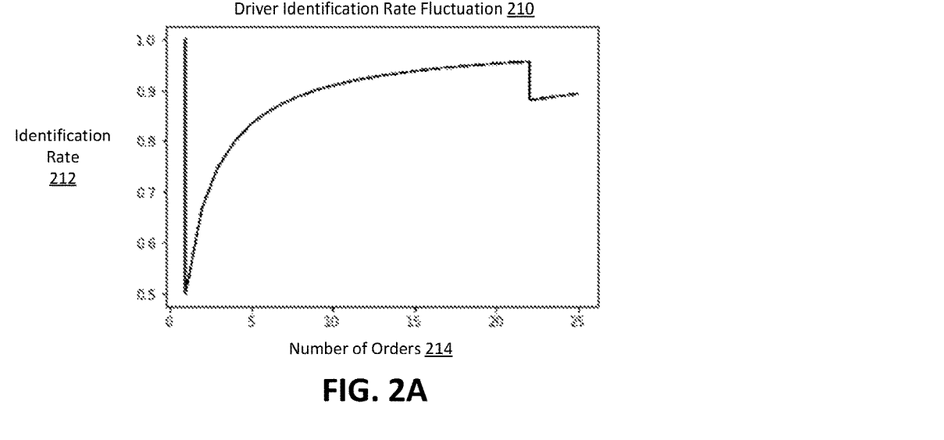
FIG. 2A illustrates an exemplary driver identification rate fluctuation, in accordance with various embodiments.
Figure 2B:
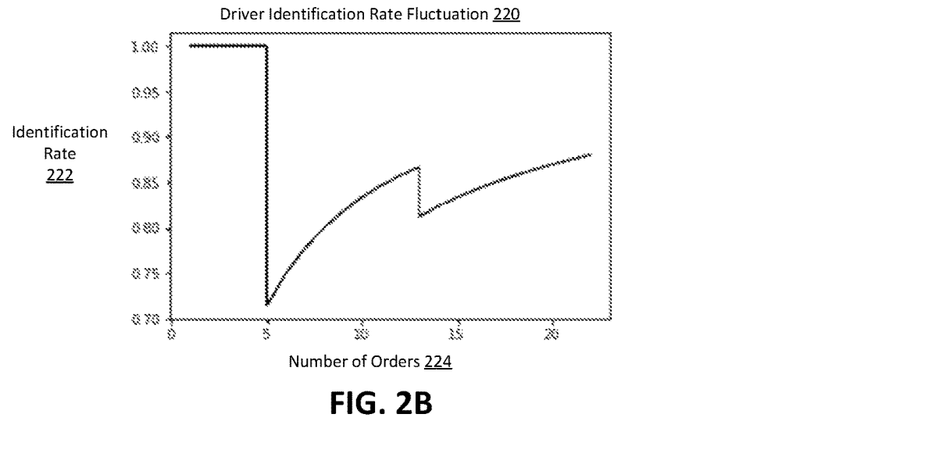
FIG. 2B illustrates an exemplary driver identification rate fluctuation, in accordance with various embodiments.
Figure 2C:
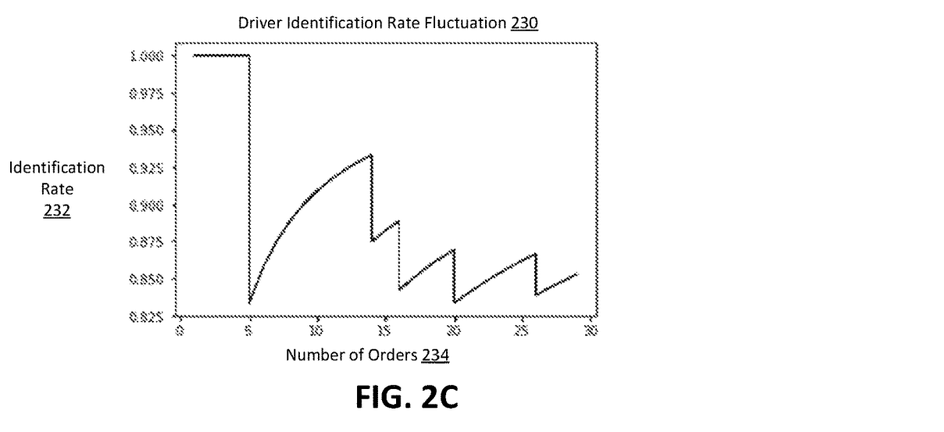
FIG. 2C illustrates an exemplary driver identification rate fluctuation, in accordance with various embodiments.

FIG. 2A, FIG. 2B, and FIG. 2C illustrate exemplary driver identification rate fluctuations, in accordance with various embodiments. The data shown in FIG. 2A, FIG. 2B, and FIG. 2C and presented below is intended to be illustrative. Driver identification rate fluctuation 210 is shown by graphing identification rate 212 against number of orders 214. Diver identification rate fluctuation 220 is shown by graphing identification rate 222 against number of orders 224. Driver identification rate fluctuation 230 is shown by graphing identification rate 232 against number of orders 234. The number of orders 214, 224, and 234 may include the number of requests for a driver and may equal a number of evaluations. The identification rates initially fluctuate greatly, but converge over time. After a certain point, stable identification rates approaching a true identification rate may be reached. In some embodiments, a convergence point number may be based on any combination of driver identification rate fluctuation 210, driver identification rate fluctuation 220, and driver identification rate fluctuation 230.

Figure 3A:
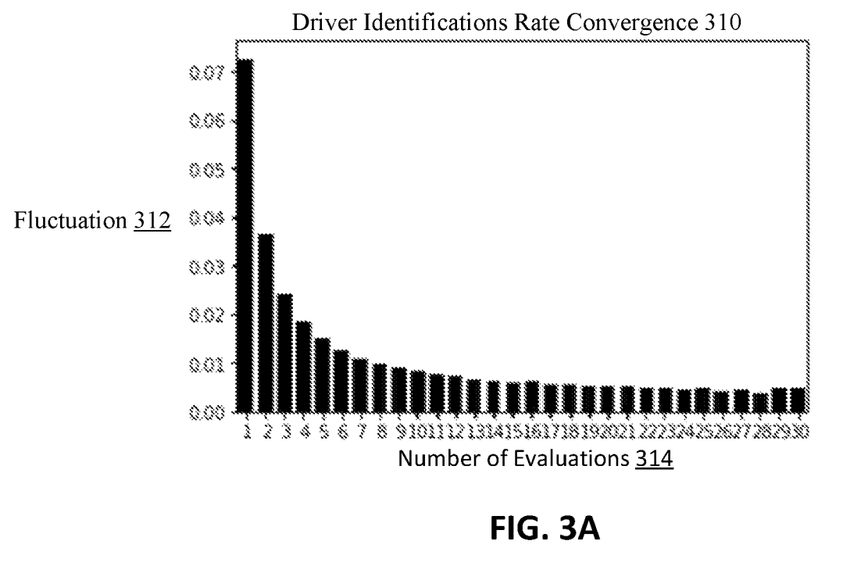
FIG. 3A illustrates an exemplary driver identifications rate convergence, in accordance with various embodiments.

FIG. 3A illustrates an exemplary driver identifications rate convergence, in accordance with various embodiments. The data shown in FIG. 3A and presented below is intended to be illustrative. Driver identifications rate convergence 310 is shown by graphing fluctuation 312 against number of evaluations 314. Fluctuation 312 may be calculated based on the difference between one identification rate and a preceding identification rate (e.g., $(IR1-IR2)^2/(2IR1), (IR1-IR2)^2/n$). The fluctuation in identification rate may converge over time. In some embodiments, the convergence point number may be determined based on driver identifications rate convergence 310.

Figure 3B:
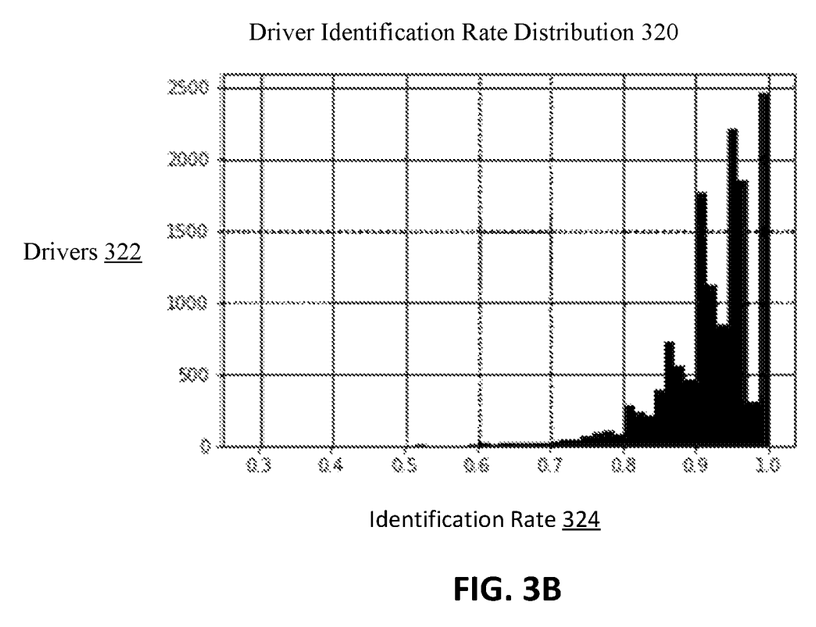
FIG. 3B illustrates an exemplary driver identification rate distribution, in accordance with various embodiments.

FIG. 3B illustrates an exemplary driver identification rate distribution, in accordance with various embodiments. The data shown in FIG. 3B and presented below is intended to be illustrative. Driver identification rate distribution 320 is shown by counting the number of drivers 322 with each identification rate 324. Driver identification rate distribution 320 may be based on all the drivers in the ride sharing platform with identification rates. The identification rates may be calculated after each driver receives a convergence point number of evaluations. Almost all the drivers may have an identification rates higher than 0.8. The threshold match rate may be based on driver identification rate distribution 320.

Figure 4A:
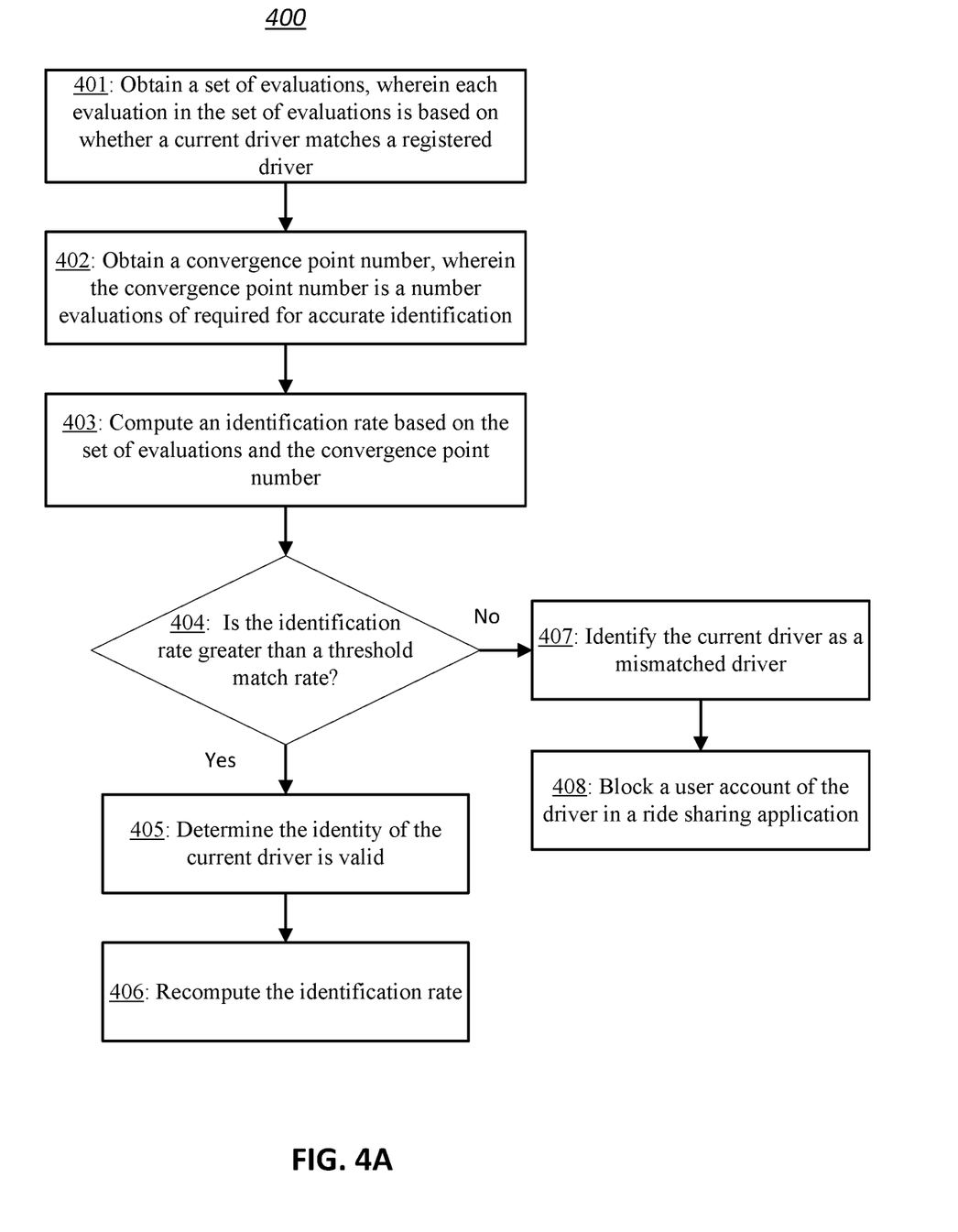
FIG. 4A illustrates a flowchart of an example method for identifying mismatched drivers, according to various embodiments of the present disclosure.

FIG. 4A illustrates a flowchart of an example method 400 for identifying mismatched drivers, according to various embodiments of the present disclosure. The method 400 may be implemented in various environments including, for example, the environment 100 of FIG. 1. The operations of the method 400 presented below are intended to be illustrative. Depending on the implementation, the method 400 may include additional, fewer, or alternative steps performed in various orders or in parallel. The method 400 may be implemented in various computing systems or devices including one or more processors.

With respect to the method 400, at block 401, a set of evaluations may be obtained. Each evaluation in the set of evaluations may be based on whether a current driver matches a registered driver. At block 402, a convergence point number may be obtained. The convergence point number may be a number of evaluations required for accurate identification. At block 403, an identification rate may be computed based on the set of evaluations and the convergence point number. At block 404, it may be determined if the identification rate is greater than a threshold match rate. This may be used to verify the current driver. If the identification rate is greater than a threshold match rate, the method may proceed to 405. If the identification rate is not greater than a threshold match rate, the method may proceed to 407.

At block 405, it may be determined that the identity of the current driver is valid. In some embodiments, the process may proceed to block 406. In some embodiments, the process may end after determining the that the identity of the current driver is valid. At block 406, the identification rate may be recomputed. In some embodiments, the identification rate may be recomputed in response to receiving a set of additional evaluations. In some embodiments, the identification rate may be recomputed after a set duration of time has elapsed. At block 407, the current driver may be identified as a mismatched driver. In some embodiments, the process may proceed to block 408. In some embodiments, the process may end after identifying the current driver as a mismatched driver. At block 408, a user account of the driver may be blocked in a ride sharing application.

Figure 4B:
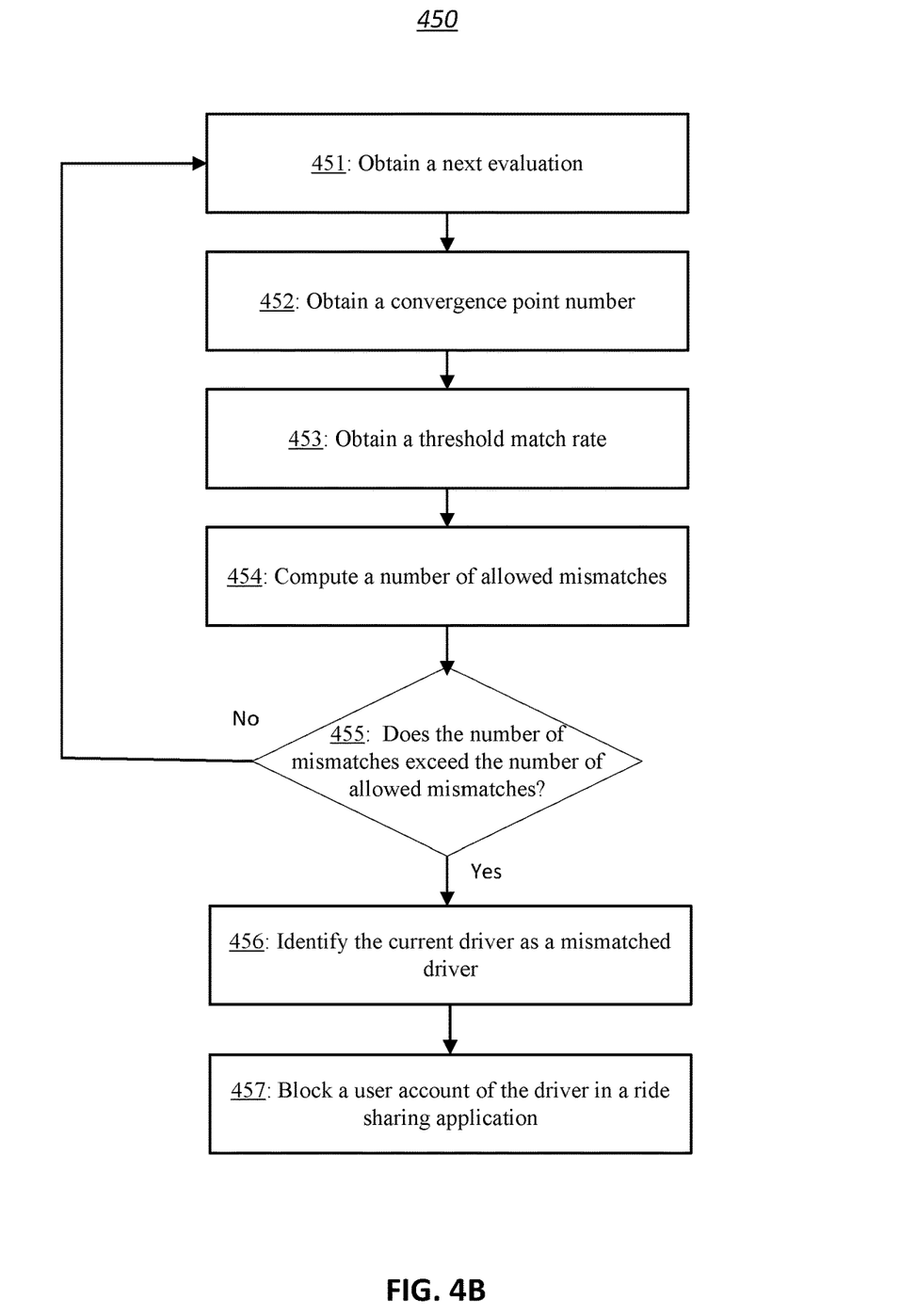
FIG. 4B illustrates a flowchart of an example method for identifying mismatched drivers, according to various embodiments of the present disclosure.

FIG. 4B illustrates a flowchart of an example method 450 for identifying mismatched drivers, according to various embodiments of the present disclosure. The method 450 may be implemented in various environments including, for example, the environment 100 of FIG. 1. The operations of the method 450 presented below are intended to be illustrative. Depending on the implementation, the method 450 may include additional, fewer, or alternative steps performed in various orders or in parallel. The method 450 may be implemented in various computing systems or devices including one or more processors.

With respect to the method 450, at block 451, a next evaluation may be obtained. The evaluation may be obtained from a passenger and indicate whether a current driver matches a registered driver. At block 452, a convergence point number may be obtained. At block 453, a threshold match rate may be obtained. At block 454, a number of allowed mismatches may be computed. The number of allowed mismatches may be computed using the convergence point number and the threshold match rate.

At block 455, it may be determined whether the number of mismatches exceed the number of allowed mismatches. The number of mismatches may be based on the next evaluation and a set of preceding evaluations. If the number of mismatches does not exceed the number of allowed mismatches rate, the method may loop back to 451 to perform additional verification. For example, the driver may not have enough mismatch evaluations to be classified as a mismatch driver, but may have not yet received a convergence point number of evaluations, so the driver cannot be verified as a valid driver. If the number of mismatches exceed the number of allowed mismatches rate, the method may proceed to 456. For example, the driver may not have received a convergence point number of evaluations, but even if all the additional evaluations identified the current driver as the registered driver, the identification rate would still be below the threshold match rate. At block 456, the current driver may be identified as a mismatched driver. At block 457, a user account of the driver may be blocked in a ride sharing application.

Figure 5:
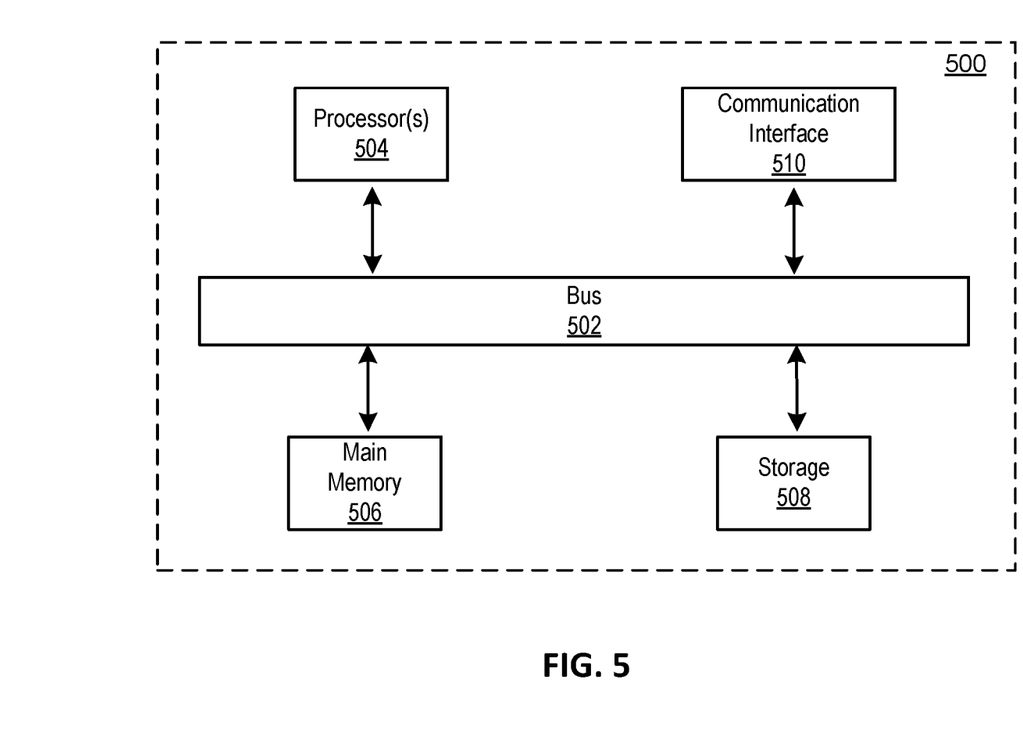
FIG. 5 is a block diagram that illustrates a computer system upon which any of the embodiments described herein may be implemented.

FIG. 5 is a block diagram that illustrates a computer system 500 upon which any of the embodiments described herein may be implemented. For example, the computer system 500 may be any one of the computing system 102 and the computing devices 104 and 106. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor(s) 504. Main memory 506 also may be used for storing temporary variables or other intermediate information during execution of instructions to be executed by processor(s) 504. Such instructions, when stored in storage media accessible to processor(s) 504, render computer system 500 into a special-purpose machine that is customized to perform the operations specified in the instructions. Main memory 506 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 508. Execution of the sequences of instructions contained in main memory 506 causes processor(s) 504 to perform the process steps described herein.

For example, the computing system 500 may be used to implement computing system 102, computing device 104, and computing device 106 shown in FIG. 1. In another example, the computing system 500 may be used to implement the one or more components of the computing system 102 shown in FIG. 1. As another example, the process/method shown in FIGS. 4A and 4B and described in connection with this figure may be implemented by computer program instructions stored in main memory 506. When these instructions are executed by processor(s) 504, they may perform the steps as shown in FIGS. 4A and 4B and described above. In alternative embodiments, hard-wired circuitry may be used in place of or in combination with software instructions.

The computer system 500 also includes a communication interface 510 coupled to bus 502. Communication interface 510 provides a two-way data communication coupling to one or more network links that are connected to one or more networks. As another example, communication interface 510 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Certain embodiments are described herein as including logic or a number of components. Components may constitute either software components (e.g., code embodied on a machine-readable medium) or hardware components (e.g., a tangible unit capable of performing certain operations which may be configured or arranged in a certain physical manner). As used herein, for convenience, components of the computing system 110 may be described as performing or configured for performing an operation, when the components may comprise instructions which may program or configure the computing system 110 to perform the operation.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A system, comprising one or more processors and one or more non-transitory computer-readable memories coupled to the one or more processors and configured with instructions executable by the one or more processors to cause the system to perform operations comprising:

displaying, by a computing device or a ride-sharing platform via ride-sharing applications installed on a plurality of passengers' phones, a pop-up in each of the ride-sharing applications for obtaining an evaluation if a current driver matches a driver listed in the ride-sharing application;

obtaining a set of evaluations from the ride-sharing applications;

determining a convergence point number based on a plurality of historical evaluations for a plurality of historical drivers collected by the ride-sharing platform, wherein the convergence point number is a number of evaluations required for accurate identification, wherein the determining the convergence point number comprises:

for each of the plurality of historical drivers, determining a historical identification rate when each historical evaluation for the historical driver is added to obtain a sequence of historical identification rates;

determining a fluctuation rate based on each pair of neighboring identification rates in the sequence of historical identification rates; and determining the convergence point number at which the fluctuation rate is stabilized;

computing an identification rate based on the set of evaluations and the convergence point number;

verifying the current driver based on a comparison of the identification rate to a threshold match rate; and blocking, if the identification rate is below the threshold match rate, a user account of the current driver in the ride-sharing platform.

2. The system of claim 1, wherein the number of evaluations in the set of evaluations equals the convergence point number; and wherein the identification rate equals the number of evaluations which identify the current driver as a registered driver divided by the number of evaluations in the set of evaluations.

3. The system of claim 1, wherein the operations further comprise:

recomputing the identification rate in response to receiving a set of additional evaluations.

4. The system of claim 1, wherein the operations further comprise:

recomputing the identification rate after a set duration of time has elapsed.

5. The system of claim 1, wherein the threshold match rate is based on a statistical analysis of a set of identification rates for a set of drivers.

6. The system of claim 1, wherein the verifying the current driver based on the comparison of the identification rate to the threshold match rate comprises:

computing a number of allowed mismatches based on the threshold match rate and the convergence point number;

determining that a number of mismatches in the set of evaluations exceeds the number of allowed mismatches; and identifying the current driver as a mismatched driver.

7. A computer-implemented method, comprising:

displaying, by a computing device or a ride-sharing platform via ride-sharing applications installed on a plurality of passengers' phones, a pop-up in each of the ride-sharing applications for obtaining an evaluation if a current driver matches a driver listed in the ride-sharing application;

obtaining a set of evaluations from the ride-sharing applications;

determining a convergence point number based on a plurality of historical evaluations for a plurality of historical drivers collected by the ride-sharing platform, wherein the convergence point number is a number of evaluations required for accurate identification, wherein the determining the convergence point number comprises:

for each of the plurality of historical drivers, determining a historical identification rate when each historical evaluation for the historical driver is added to obtain a sequence of historical identification rates;

determining a fluctuation rate based on each pair of neighboring identification rates in the sequence of historical identification rates; and determining the convergence point number at which the fluctuation rate is stabilized;

computing an identification rate based on the set of evaluations and the convergence point number;

verifying the current driver based on a comparison of the identification rate to a threshold match rate; and blocking, if the identification rate is below the threshold match rate, a user account of the current driver in the ride-sharing platform.

8. The method of claim 7, wherein the number of evaluations in the set of evaluations equals the convergence point number; and wherein the identification rate equals the number of evaluations which identify the current driver as a registered driver divided by the number of evaluations in the set of evaluations.

9. The method of claim 7, wherein the method further comprises:

recomputing the identification rate in response to receiving a set of additional evaluations.

10. The method of claim 7, wherein the method further comprises:

recomputing the identification rate after a set duration of time has elapsed.

11. The method of claim 7, wherein the threshold match rate is based on a statistical analysis of a set of identification rates for a set of drivers.

12. The method of claim 7, wherein the verifying the current driver based on the comparison of the identification rate to the threshold match rate comprises:

computing a number of allowed mismatches based on the threshold match rate and the convergence point number;

determining a number of mismatches in the set of evaluations exceeds the number of allowed mismatches; and identifying the current driver as a mismatched driver.

13. A non-transitory computer-readable storage medium configured with instructions executable by one or more processors to cause the one or more processors to perform operations comprising:

displaying, by a computing device or a ride-sharing platform via ride-sharing applications installed on a plurality of passengers' phones, a pop-up in each of the ride-sharing applications for obtaining an evaluation if a current driver matches a driver listed in the ride-sharing application;

obtaining a set of evaluations from the ride-sharing applications;

determining a convergence point number based on a plurality of historical evaluations for a plurality of historical drivers collected by the ride-sharing platform, wherein the convergence point number is a number of evaluations required for accurate identification, wherein the determining the convergence point number comprises:
- for each of the plurality of historical drivers, determining a historical identification rate when each historical evaluation for the historical driver is added to obtain a sequence of historical identification rates;
- determining a fluctuation rate based on each pair of neighboring identification rates in the sequence of historical identification rates; and
- determining the convergence point number at which the fluctuation rate is stabilized;

computing an identification rate based on the set of evaluations and the convergence point number;
verifying the current driver based on a comparison of the identification rate to a threshold match rate; and
blocking, if the identification rate is below the threshold match rate, a user account of the current driver in the ride-sharing platform.

14. The non-transitory computer-readable storage medium of claim 13, wherein the number of evaluations in the set of evaluations equals the convergence point number; and wherein the identification rate equals the number of evaluations which identify the current driver as a registered driver divided by the number of evaluations in the set of evaluations.

15. The non-transitory computer-readable storage medium of claim 13, wherein the operations further comprise:

recomputing the identification rate in response to receiving a set of additional evaluations.

16. The non-transitory computer-readable storage medium of claim 13, wherein the verifying the current driver based on the comparison of the identification rate to the threshold match rate comprises:

computing a number of allowed mismatches based on the threshold match rate and the convergence point number;

determining a number of mismatches in the set of evaluations exceeds the number of allowed mismatches; and identifying the current driver as a mismatched driver.

* * * * *